United States Patent
Bicker et al.

(10) Patent No.: US 7,577,427 B2
(45) Date of Patent: *Aug. 18, 2009

(54) SYSTEM AND METHOD OF TRANSITIONING BETWEEN CELLULAR AND VOICE OVER INTERNET PROTOCOL COMMUNICATION

(75) Inventors: Dennis D. Bicker, San Ramon, CA (US); Charles R. Dilley, Antioch, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 221 days.

This patent is subject to a terminal disclaimer.

(21) Appl. No.: 10/702,132

(22) Filed: Nov. 5, 2003

(65) Prior Publication Data

US 2005/0096024 A1 May 5, 2005

(51) Int. Cl.
*H04M 24/00* (2006.01)
(52) U.S. Cl. .................. 455/417; 455/414.1; 455/436; 370/259
(58) Field of Classification Search .............. 455/417, 455/436, 414.1; 370/352, 354, 352.3, 259
See application file for complete search history.

(56) References Cited

U.S. PATENT DOCUMENTS

| 4,275,385 A | 6/1981 | White |
| 4,752,951 A | 6/1988 | Konneker |

(Continued)

FOREIGN PATENT DOCUMENTS

EP 0 671859 9/1995

(Continued)

OTHER PUBLICATIONS

Charny, Ben; "VoIP Phone Maker Plans Cell Hybrid"; http://zdnet.com, News Software; Oct. 3, 2003. pp. 1-3.

(Continued)

*Primary Examiner*—Dwayne Bost
*Assistant Examiner*—Pierre-Louis Desir
(74) *Attorney, Agent, or Firm*—Toler Law Group

(57) ABSTRACT

A multi-mode cellular and voice over internet protocol mobile device and a supporting network is disclosed. The mobile device includes a housing, an antenna, a wide area cellular communications module to provide wide area cellular communications, and a short-range wireless local area network module to provide a wireless communications interface to a wireless local area network having voice over internet protocol capability. In a particular embodiment, an internet protocol address managed by a wireless LAN base station is forwarded to and stored by the mobile phone device. In another embodiment, a method of forwarding a call from a mobile phone to a wireless LAN base station is disclosed. In another illustrative embodiment, a method of communicating from a wireless LAN base station to a mobile phone is disclosed. The method includes determining that the mobile phone is within range of a wireless LAN base station, connecting the mobile phone to the wireless LAN, including retrieving an internet protocol address, connecting the mobile phone to the voice over internet protocol (VoIP) provider, including retrieving an optional port number, and sending the internet protocol address and optional port number of the VoIP provider to the cellular provider as a request to forward calls for the mobile phone through the VoIP provider.

16 Claims, 4 Drawing Sheets

U.S. PATENT DOCUMENTS

| | | | |
|---|---|---|---|
| 4,768,224 A | 8/1988 | Waldman |
| 4,932,050 A | 6/1990 | Davidson et al. |
| 4,935,927 A | 6/1990 | Kaewell, Jr. et al. |
| 4,989,230 A | 1/1991 | Gillig et al. |
| 5,127,042 A | 6/1992 | Gillig et al. |
| 5,142,695 A | 8/1992 | Roberts et al. |
| 5,155,759 A | 10/1992 | Saegusa et al. |
| 5,218,716 A | 6/1993 | Comroe et al. |
| 5,229,701 A | 7/1993 | Leman et al. |
| 5,247,567 A | 9/1993 | Hirano |
| 5,260,988 A | 11/1993 | Schellinger et al. |
| 5,353,331 A | 10/1994 | Emery et al. |
| 5,367,558 A | 11/1994 | Gillig et al. |
| 5,375,161 A | 12/1994 | Fuller et al. |
| 5,442,680 A | 8/1995 | Schellinger et al. |
| 5,469,496 A | 11/1995 | Emery et al. |
| 5,515,366 A | 5/1996 | Chieu et al. |
| 5,550,895 A | 8/1996 | Burson et al. |
| 5,553,117 A | 9/1996 | Peterson et al. |
| 5,603,054 A | 2/1997 | Theimer et al. |
| 5,636,243 A | 6/1997 | Tanaka |
| 5,644,620 A | 7/1997 | Shimura |
| 5,673,308 A | 9/1997 | Akhavan |
| 5,712,911 A | 1/1998 | Her |
| 5,745,850 A | 4/1998 | Aldermeshian et al. |
| 5,748,147 A | 5/1998 | Bickley et al. |
| 5,751,789 A | 5/1998 | Farris et al. |
| 5,842,112 A | 11/1998 | Fuller et al. |
| 5,920,815 A | 7/1999 | Akhavan |
| 5,950,133 A | 9/1999 | Bledsoe |
| 5,995,839 A | 11/1999 | Coursey et al. |
| 6,041,229 A | 3/2000 | Turner |
| 6,069,588 A | 5/2000 | O'Neill, Jr. |
| 6,073,031 A | 6/2000 | Helstab et al. |
| 6,091,948 A | 7/2000 | Carr et al. |
| 6,091,949 A | 7/2000 | Sanchez |
| 6,130,938 A | 10/2000 | Erb |
| 6,185,427 B1 | 2/2001 | Krasner et al. |
| 6,188,888 B1 | 2/2001 | Bartle et al. |
| 6,201,950 B1 | 3/2001 | Fuller et al. |
| 6,208,854 B1 | 3/2001 | Roberts et al. |
| 6,231,371 B1 | 5/2001 | Helot |
| 6,233,450 B1 | 5/2001 | Seppanen |
| 6,240,297 B1 | 5/2001 | Jadoul |
| 6,253,231 B1 | 6/2001 | Fujii |
| 6,301,350 B1 | 10/2001 | Henningson et al. |
| 6,320,534 B1 | 11/2001 | Goss |
| 6,332,082 B1 | 12/2001 | Fuller et al. |
| 6,362,778 B2 | 3/2002 | Neher |
| 6,373,817 B1 | 4/2002 | Kung et al. |
| 6,389,117 B1 | 5/2002 | Gross et al. |
| 6,424,840 B1 | 7/2002 | Fitch et al. |
| 6,480,593 B1 | 11/2002 | Munday et al. |
| 6,484,027 B1 | 11/2002 | Mauney et al. |
| 6,505,055 B1 | 1/2003 | Kahn et al. |
| 6,516,060 B1 | 2/2003 | Foladare et al. |
| 6,574,213 B1 | 6/2003 | Anandakumar et al. |
| 6,574,470 B1 | 6/2003 | Chow et al. |
| 6,587,475 B1 | 7/2003 | Przygienda |
| 6,587,683 B1 | 7/2003 | Chow et al. |
| 6,600,734 B1 | 7/2003 | Gernert et al. |
| 6,609,006 B1 | 8/2003 | Mori |
| 6,611,681 B2 | 8/2003 | Henderson |
| 6,614,206 B1 | 9/2003 | Wong et al. |
| 6,614,784 B1 | 9/2003 | Glitho et al. |
| 6,625,423 B1 | 9/2003 | Wang |
| 6,650,088 B1 | 11/2003 | Webb et al. |
| 6,704,580 B1 | 3/2004 | Fintel |
| 6,708,028 B1 | 3/2004 | Byrne |
| 6,732,432 B2 | 5/2004 | Jarett et al. |
| 6,735,432 B1 | 5/2004 | Jarett et al. |
| 6,763,250 B1 | 7/2004 | Forbes, Jr. |
| 6,766,175 B2 | 7/2004 | Uchiyama |
| 6,798,647 B2 | 9/2004 | Dickie |
| 6,856,806 B1 | 2/2005 | Bosik et al. |
| 6,892,083 B2 * | 5/2005 | Shostak .................... 455/575.6 |
| 6,931,249 B2 * | 8/2005 | Fors et al. .................... 455/436 |
| 6,950,675 B2 | 9/2005 | Wilhelm |
| 6,975,713 B1 | 12/2005 | Smith et al. |
| 6,978,154 B1 | 12/2005 | Ospalak et al. |
| 6,978,163 B2 | 12/2005 | Dyer et al. |
| 6,987,988 B2 | 1/2006 | Uchiyama |
| 6,993,363 B1 | 1/2006 | Hsu |
| 7,006,833 B1 | 2/2006 | Contractor |
| 7,068,669 B2 | 6/2006 | Abrol et al. |
| 7,171,199 B1 | 1/2007 | Rahman |
| 2001/0014599 A1 | 8/2001 | Henderson |
| 2001/0019955 A1 | 9/2001 | Henderson |
| 2001/0024953 A1 | 9/2001 | Balogh |
| 2002/0000930 A1 | 1/2002 | Crowson et al. |
| 2002/0029258 A1 | 3/2002 | Mousseau et al. |
| 2002/0111190 A1 | 8/2002 | Harrison et al. |
| 2002/0113879 A1 | 8/2002 | Battle et al. |
| 2002/0115480 A1 | 8/2002 | Huang |
| 2002/0119800 A1 | 8/2002 | Jaggers et al. |
| 2002/0137472 A1 | 9/2002 | Quinn et al. |
| 2002/0165988 A1 | 11/2002 | Khan et al. |
| 2002/0181442 A1 | 12/2002 | Rajani |
| 2003/0003900 A1 | 1/2003 | Goss et al. |
| 2003/0011682 A1 | 1/2003 | Sellen et al. |
| 2003/0039242 A1 * | 2/2003 | Moore, Jr. .................... 370/354 |
| 2003/0040308 A1 | 2/2003 | Gieseke |
| 2003/0050051 A1 | 3/2003 | Vilander |
| 2003/0073411 A1 | 4/2003 | Meade |
| 2003/0092451 A1 | 5/2003 | Holloway et al. |
| 2003/0125075 A1 | 7/2003 | Klovborg |
| 2003/0133421 A1 | 7/2003 | Sundar et al. |
| 2003/0134630 A1 | 7/2003 | Scheinert et al. |
| 2003/0181202 A1 | 9/2003 | Link, III et al. |
| 2003/0217180 A1 * | 11/2003 | Chandra et al. .............. 709/245 |
| 2004/0018774 A1 | 1/2004 | Long et al. |
| 2004/0032484 A1 | 2/2004 | Halttunen |
| 2004/0051497 A1 | 3/2004 | Richards et al. |
| 2004/0066776 A1 * | 4/2004 | Ishidoshiro .................. 370/352 |
| 2004/0072544 A1 | 4/2004 | Alexis |
| 2004/0116073 A1 | 6/2004 | Mauney et al. |
| 2004/0120492 A1 | 6/2004 | Lew et al. |
| 2004/0127241 A1 * | 7/2004 | Shostak ....................... 455/500 |
| 2004/0156491 A1 | 8/2004 | Reding et al. |
| 2004/0203374 A1 | 10/2004 | Zilliacus |
| 2004/0203648 A1 | 10/2004 | Wong et al. |
| 2004/0204056 A1 | 10/2004 | Phelps, III |
| 2004/0208297 A1 | 10/2004 | Valentine |
| 2004/0213212 A1 * | 10/2004 | Reding et al. ................ 370/352 |
| 2004/0218575 A1 * | 11/2004 | Ibe et al. ..................... 370/338 |
| 2004/0219948 A1 * | 11/2004 | Jones et al. .............. 455/552.1 |
| 2004/0259544 A1 | 12/2004 | Amos |
| 2004/0266425 A1 | 12/2004 | Gonsalves et al. |
| 2005/0020236 A1 | 1/2005 | Mauney et al. |
| 2005/0032475 A1 | 2/2005 | Mauney et al. |
| 2005/0054335 A1 | 3/2005 | Pearson et al. |
| 2005/0063360 A1 | 3/2005 | Lowmaster |
| 2005/0063528 A1 | 3/2005 | Pearson et al. |
| 2005/0064853 A1 | 3/2005 | Radpour |
| 2005/0064855 A1 | 3/2005 | Russell |
| 2005/0091250 A1 | 4/2005 | Dunn et al. |
| 2005/0091290 A1 | 4/2005 | Cameron et al. |
| 2005/0096024 A1 * | 5/2005 | Bicker et al. ................ 455/417 |
| 2005/0201362 A1 | 9/2005 | Klein et al. |
| 2005/0210101 A1 | 9/2005 | Janik |
| 2005/0215243 A1 | 9/2005 | Black et al. |
| 2005/0273781 A1 | 12/2005 | Nakamura et al. |
| 2005/0277431 A1 | 12/2005 | White |
| 2005/0282582 A1 | 12/2005 | Slotznick |

| | | | |
|---|---|---|---|
| 2006/0003806 | A1 | 1/2006 | Weber et al. |
| 2006/0031587 | A1 | 2/2006 | Paterson et al. |
| 2006/0136546 | A1 | 6/2006 | Trioano et al. |
| 2007/0042789 | A1 | 2/2007 | Moton et al. |

FOREIGN PATENT DOCUMENTS

| | | |
|---|---|---|
| EP | 0 713345 | 5/1996 |
| EP | 1107549 A2 | 6/2001 |
| EP | 1 445 936 A1 | 11/2004 |
| GB | 2 305078 | 3/1997 |
| JP | 8-163646 | 6/1996 |
| JP | 8-172673 | 7/1996 |
| JP | 8-137468 | 11/1996 |
| JP | 8-294168 | 11/1996 |
| JP | 8-294170 | 11/1996 |
| JP | 8-322087 | 12/1996 |
| JP | 9-37345 | 2/1997 |
| JP | 9-55981 | 2/1997 |
| JP | 9-84117 | 3/1997 |
| JP | 9-98476 | 4/1997 |
| WO | WO 94/05101 | 3/1994 |

OTHER PUBLICATIONS

Verb Exchange Service—Tagline—One number gets me everywhere; www.verbx.com/srv/service_tagline.html; May 16, 2003. 1 page.

Zbar, Jeff "Follow-me phone service keeps remote worker tethered to clients, co-workers"; Network WorldFusion; www.nwfusion.com/net.worker/columnists/2002/0826zbar.html; May 16, 2003, 3pages.

www.officescape.com/services.asp; Follow-me phone; May 16, 2003. 1 page.

Callagenix "call diversion service"; www.callagenix.com/services/diversion.html; May 16, 2003, 3 pages.

Gupta, Puneet, "Short Message Service: What, How and Where?"; Wireless Developer Network; www.wirelessdevnet.com/channels/sms/features/sms.html; Jul. 8, 2003. 7 pages.

Webopedia; "Short Message Service"; www.webopedia.com/TERM/S/Short_Message_Service.html; Jul. 8, 2003. 3 pages.

"Cellular Phone and Roaming Service"; www.members.tripod.com/peacecraft/infomining/cellphon.htm; Jul. 8, 2003. 19 pages.

Bluetooth Consortium, "Specification of the Bluetooth System: Profiles"; Dec. 1, 1999, pp. 1-59.

Schneiderman, R., "Bluetooth's Slow Down", IEEE, Dec. 1999, pp. 61-65.

Haartsen, J., "Bluetooth: A New Radio Interface Providing Ubiquitous Connectivity", IEEE, Dec. 2000, pp. 107-111.

International Search Report and Written Opinion of the International Searching Authority for PCT/US04/34239; Feb. 17, 2005; 10 pages.

International Search Report and Written Opinion of the International Searching Authority for PCT/US05/16449; Apr. 10, 2006; 11 pages.

International Search Report and Written Opinion of the International Searching Authority for PCT/US04/16017; Aug. 16, 2005; 7 pages.

International Search Report and Written Opinion of the International Searching Authority for PCT/US04/28260; Sep. 30, 2005; 10 pages.

Waters, James, Introduction Neon Tech's SurfReady Set-Top Box, printed from http://www.net4tv.com/VOICE/Story.cfrn?storyID=3199, Jan. 07, 2001 12 pages.

Corresponding EP Search Report conducted Sep. 29, 2006.

* cited by examiner

SYSTEM AND METHOD OF TRANSITIONING BETWEEN CELLULAR AND VOICE OVER INTERNET PROTOCOL COMMUNICATION

FIELD OF THE DISCLOSURE

The present application relates in general to a combined cellular and voice over internet protocol mobile device and relates to methods of forwarding calls from a cellular network to a wireless local area network that supports voice over internet protocol.

BACKGROUND

Cellular telephone use is widespread and provides user convenience and mobility. However, cellular telephone use from a service provider perspective is often more expensive than traditional landline telephone service. In addition, service provider costs may be further reduced through the use of newer technology, such as computer network communications systems using the voice over internet protocol.

Accordingly, there is a need for a system and method for transitioning cellular phone traffic to lower cost telephony services.

DESCRIPTION OF THE DRAWINGS

A multi-mode cellular and voice over internet protocol mobile device and a supporting network is disclosed. The mobile device includes a housing, an antenna, a wide area cellular communications module to provide wide area cellular communications, and a short-range wireless local area network module to provide a wireless communications interface to a wireless local area network having voice over internet protocol capability. In a particular embodiment, the internet protocol address and the port number of a wireless LAN base station is forwarded to and stored by the mobile phone device. In another embodiment, a method of forwarding a call from a mobile phone to a wireless LAN base station is disclosed. In another illustrative embodiment, a method of communicating from a wireless LAN base station to a mobile phone is disclosed. The method includes determining that the mobile phone is within range of a wireless LAN base station with voice over internet protocol (VoIP), retrieving an internet protocol address and port number of the wireless LAN base station, and sending the internet protocol address and the port number over a wireless fidelity communication link to the mobile phone.

Figure 1:
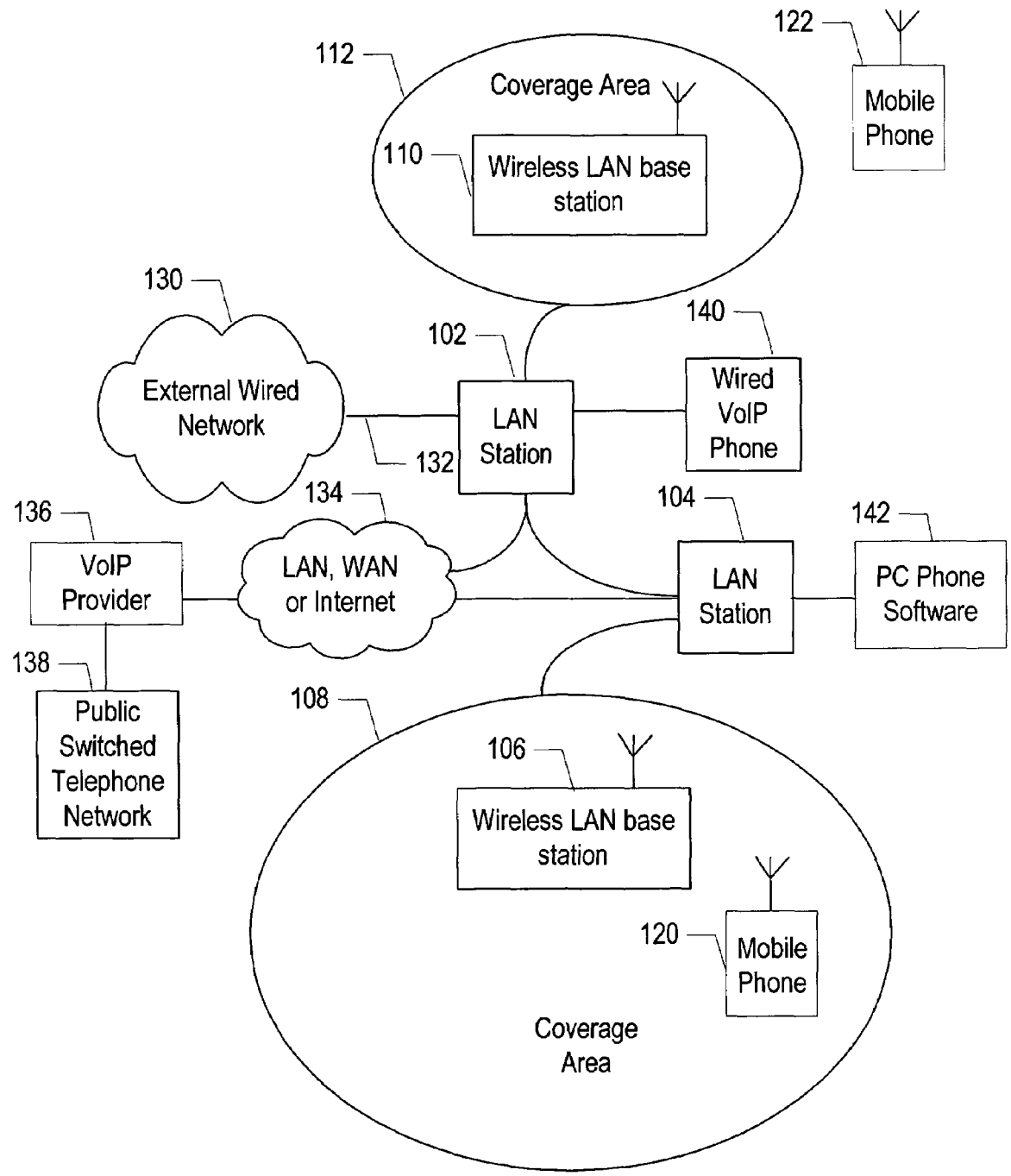
FIG. 1 is a block diagram that illustrates a communications system including wireless local area network (LAN) stations for communicating with mobile devices.

Referring to FIG. 1, a communications system is illustrated. The communications system includes a first wireless LAN 110 having a first coverage area 112 and a second wireless LAN 106 having a second coverage area 108. The first wireless LAN 110 is coupled to a LAN station 102 via a computer network connection. The LAN station 102 is coupled to another illustrative computer network node, LAN station 104. LAN station 104 is coupled to the second wireless LAN 106. A first representative mobile phone 122 is located outside of the first wireless LAN coverage area 112 so that the mobile phone 122 is not in range to communicate with the first wireless LAN 110. A second representative mobile phone 120 is located within the second coverage area 108, such that the mobile phone 120 is in range for communication with the second wireless LAN base station 106. One or more of the LAN stations may be coupled to an external network. For example, in FIG. 1, the LAN station 102 is coupled to an external wired network 130, such as the internet, via a communications link 132, such as a digital subscriber line (DSL) or other suitable connection. The external wired network 130 may be coupled to other external networks that are not illustrated, such as the public switched telephone network and the public wide area cellular network.

The system also includes a LAN, WAN or internet 134 coupled to the LAN stations 102, 104, and a VoIP provider 136 coupled to the LAN, WAN, or internet 134. The VoIP provider 136 is also coupled to the public switched telephone network 138. The LAN or WAN 134 or any of the LAN stations 102, 104 may include personal computer (PC) phone software 142, such as NetMeeting, Net2Phone, and Phone-Free. LAN Station 102 may be coupled to a wired VoIP phone 140.

If the VoIP provider 136 is connected directly to the Local Area Network (LAN) 134, then calls originating and terminating on the LAN would stay within the LAN and would not go over the PSTN 138. This includes calls where one end is the new mobile phone 120, 122 and the other end is any of the following: 1) another of the new mobile phones within range of a wireless base-station on the LAN, 2) a wired VoIP Phone on the LAN, or 3) PC Phone Software 142 on the LAN 104.

If the VoIP provider 136 is connected directly to the Wide Area Network (WAN), then calls originating and terminating on the WAN would stay within the WAN and would not go over the PSTN 138. This includes calls where one end is the new mobile phone 120, 122 and the other end is any of the following: 1) another of the new mobile phones within range of a wireless base-station on the WAN, 2) a wired VoIP Phone 140 on the WAN, or 3) PC Phone Software 142 on the WAN 134.

If the VoIP provider 136 is connected to the internet 130, then calls originating and terminating on the internet 130 would stay within the internet and would not go over the PSTN 138. This includes calls where one end is the new mobile phone 120, 122 and the other end is any of the following: 1) another of the new mobile phones within range of a wireless base-station on the internet 134, 2) a wired VoIP Phone on the Internet, or 3) PC Phone Software 142 on the internet.

If the call originates or terminates with a telephone on the PSTN 138, whether the wireline or cellular network, then the VoIP provider 136 would need to perform the VoIP translation from PSTN to IP and IP to PSTN.

During operation, a mobile communications device that is within range of a wireless LAN, such as the illustrated mobile phone 120 that is within range of the second wireless LAN 106, may transition communications from an external communication mechanism, such as provided by the cellular phone network, to short-range communication within the wireless LAN coverage area 108. Once the opportunity for short-range communication is detected, either the system or the mobile phone device may initiate the transition to the short-range communication technique. Often, short-range communications using a wireless LAN can provide for a clearer communications channel for voice traffic at a lower cost than the cellular wide area network. Also, the short-range communications provided by the wireless LAN may be located within a building or in areas where cellular coverage is not available.

Figure 2:
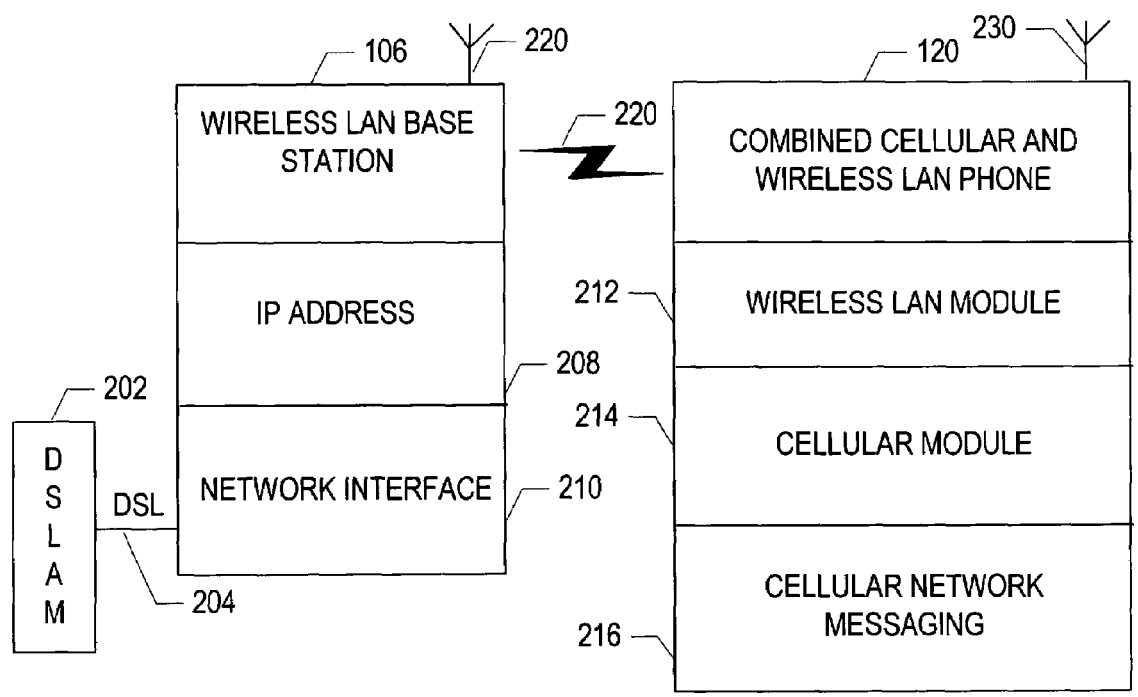
FIG. 2 is a general diagram that illustrates further details of a communication between a wireless LAN and a representative mobile device that includes a cellular communications module and a wireless LAN interface module.

Referring to FIG. 2, a sample short-range communication between the wireless LAN 106 and the mobile phone 120 is illustrated. The wireless LAN base station 106 includes a memory that contains an internet protocol address 208, and optionally a local port number. The combination of the internet protocol address and the port number uniquely identifies a communication path for short-range communications with a particular mobile device, such as to the mobile phone 120. The wireless LAN 106 also includes an antenna 220 to provide for wireless communications and includes a network interface to communicate with a wired network element. The illustrated network interface 210 is coupled to the digital subscriber line access multiplexer (DSLAM) 202 via a DSL line 204. In a particular embodiment, the VoIP to wireline interface may be located close to the DSLAM to reduce internet lag time and to thereby provide for improved voice communications.

Referring to FIG. 2, the mobile phone 120 is a combined cellular phone and voice over internet protocol (multi-mode) communication device to provide short-range wireless LAN and cellular wide area communications. The mobile phone 120 includes a housing and an antenna 230 attached to the housing. The housing includes various electronic elements including various integrated circuits and connector elements assembled on one or more printed circuit boards. The combined mobile communications device 120 includes a wireless LAN communications module 212 and a cellular communications module 214. The mobile communications device 120 may also include a cellular network messaging module 216. An example of network messaging is the short message service (SMS) used with cellular phones for text messages. The wireless LAN communications module 212, the cellular communications module 214 and the network messaging module 216 may be implemented as separate semiconductor devices (e.g. separate cellular, GPRS, and 802.11 chip sets) or some portion of such functions may be integrated using computer software or firmware into a microprocessor or other similar digital processing device. Programming of the mobile phone, including VoIP provider internet protocol addresses, user identification and passwords, and wireless LAN user identification and passwords, may be accomplished using a computer connected to the mobile phone through the wireless network.

Figure 3:
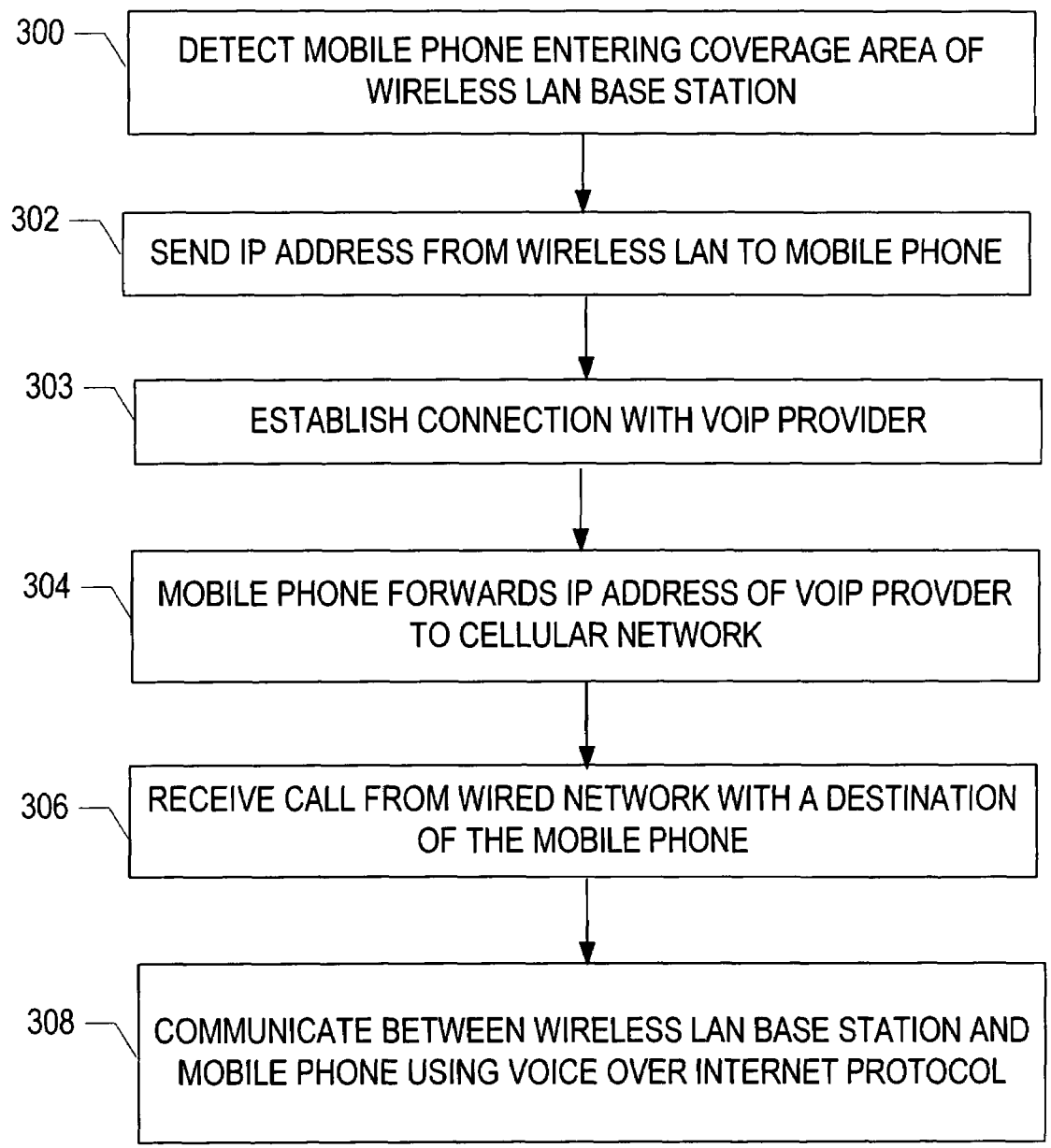
FIG. 3 is a flow chart that illustrates a method of handling call with respect to a wireless LAN

Referring to FIG. 3, a method of communicating from a wireless LAN base station to a mobile communications device is shown. The mobile communications device, such as mobile phone 120, is detected entering the coverage area of the wireless LAN base station, at 300. The detection of the mobile phone 120 may be determined by the communication of a response message from the mobile phone 120 to a broadcast communicated by the wireless LAN base station. An example of data message communication is provided in the wireless fidelity communications standard IEEE 802.11. The wireless LAN issues an internet protocol address to the mobile phone, such as by use of the dynamic host configuration protocol (DHCP), at 302. The mobile phone connects to the VoIP provider, sending any required user identification and password, at 303, and may receive an optional port number to use. The mobile phone sends the internet protocol address of the VoIP provider and the optional port number to a remote cellular network in communication with the mobile phone, at 304. The forwarding of such information may be communicated as part of a call forwarding message, such that the cellular network is directed to forward subsequent calls having a destination of the mobile phone to instead be routed to the VoIP provider through the wireless LAN as identified by the internet protocol and the port number.

A call having a destination corresponding to the mobile phone, such as a forwarded call redirected from the cellular network, is received by a wired network coupled to the wireless LAN and then received at the wireless LAN, at 306. Upon receipt of the incoming call, the wireless LAN establishes a short-range wireless communication with the mobile phone, such as by use of the voice over internet protocol, at 308. The incoming call is then connected to the short-range communication path to establish a connection between an originator of the call and the destination mobile phone, via the intermediate wireless LAN. Two way communications, such as a telephone voice call and/or data messaging, is then provided over the voice over internet protocol communication path that was previously established.

Upon completion of the call, the short-range wireless connection and the computer network wired connections are retained. In addition, if the mobile phone moves outside the range of the wireless LAN, the call would either be lost or preferably, the call would be transitioned back to another communications channel, such as the wide area cellular network. The transition of the call from the wireless LAN to the cellular network may be implemented using a mechanism similar to the handoff methods that are used to handle the transition of cellular calls between different cellular base stations of the cellular network. In some embodiments, data within the cellular network may be updated dynamically to handle call transitions between the cellular network and the short-range wireless LAN network. Such data handling may be performed using the visitor and home location registers of the cellular network.

Figure 4:
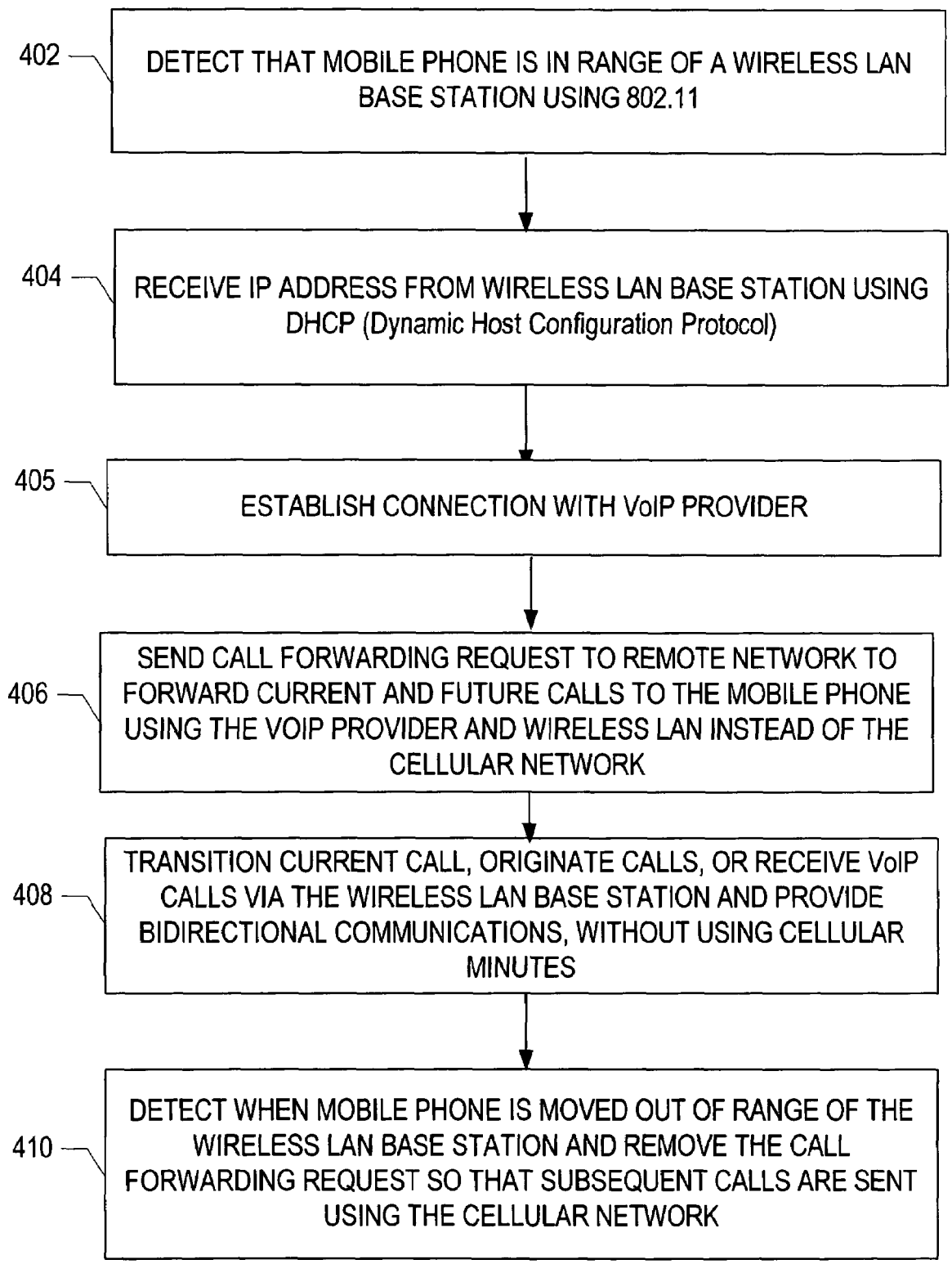
FIG. 4 is a flow chart that illustrates a method of forwarding cellular calls from a mobile communications device.

Referring to FIG. 4, a method of forwarding cellular calls to wireless LAN calls is illustrated. The mobile phone is detected as being within range of a wireless LAN base station, such as via the 802.11 protocol, at 402. The mobile phone receives an internet protocol address of the wireless LAN base station, such by use of the dynamic host configuration protocol (DHCP), at 404, and establishes a connection with a VoIP provider, at 405. The mobile phone stores the internet protocol and the port number into a computer readable memory. The mobile phone sends a call forwarding request to a remote wide area network to forward future calls directed to the mobile phone using the VoIP provider and wireless LAN instead of the cellular network, at 406. After establishing call forwarding, a voice over internet protocol call is received by the mobile phone from the VoIP provider through the wireless LAN base station. Bidirectional communication is then available over the wireless LAN network without further use of cellular network minutes and the associated costs of the cellular call, at 408. At 410, the mobile phone detects an out of range condition with respect to the coverage area of the supporting wireless LAN. The mobile phone removes the call forwarding request so that subsequent calls are sent directly to the mobile phone using the cellular network instead of the wireless LAN. In addition, the current call may be transitioned to the cellular network using a call handoff.

A system and method of providing cellular and short-range wireless communications has been disclosed. The disclosed system may be used to reduce the cost of operating a cellular phone from a service provider perspective and may save subscriber cellular minutes. In addition, the disclosed method of automatically routing cellular calls over VoIP through use of a local wireless LAN base station may beneficially reduce cellular congestion conditions, when a user is located near a supporting wireless LAN base station. Improved call clarity may also be provided depending on the location of the user.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of forwarding a call from a mobile phone, the method comprising:
   determining that the mobile phone is within range of a wireless local area network base station with voice over internet protocol capability, the mobile phone including a wireless local area network (WLAN) module and a wireless wide area network (WWAN) module;
   receiving an internet protocol address associated with the wireless local area network base station via the WLAN module;
   sending a call forwarding message including the Internet Protocol (IP) address from the mobile phone to a remote cellular network element of a wide area cellular network via the WWAN module, the call forwarding message to redirect a call destined for the mobile phone to the wireless local area network base station for transmission to the mobile phone;
   determining that the mobile phone has moved out of range of the wireless local area network base station and while the mobile phone is out of range of the wireless local area network base station, sending a message to the cellular network element to cancel call forwarding to the wireless local area network base station.

2. The method of claim 1, wherein the mobile phone receives the redirected call from the wireless local area network base station and allows voice communication using a voice over internet protocol.

3. The method of claim 1, wherein the mobile phone determines that it is in range of the wireless local area network by receiving a message in accordance with an IEEE 802.11 communication protocol.

4. The method of claim 1, wherein the internet protocol address is communicated to the mobile phone using a dynamic host configuration protocol.

5. The method of claim 1, wherein the wide area cellular network sends a call directly to the mobile phone over a cellular spectrum after the mobile phone has moved out of range of the wireless local area network base station.

6. The method of claim 2, wherein the mobile phone and the wireless local area network base station communicate bidirectionally using a voice over internet protocol.

7. A mobile phone device comprising:
   a housing;
   an antenna attached to the housing;
   a wide area cellular communications module disposed within the housing, the wide area cellular communications module having a cellular interface to communicate with a remote wide area cellular network; and
   a short-range wireless local area network module disposed within the housing, the short-range wireless local area network module including a wireless interface to communicate with the wireless local area network having voice over internet protocol communications capability, the short-range wireless local area network module adapted to receive an Internet Protocol (IP) address from the wireless local area network;
   wherein the wide area cellular communication module formulates a call forwarding message that includes the IP address; and
   wherein the wide area cellular communication module communicates the call forwarding message to the remote wide area cellular network via the cellular interface; and
   wherein the wide area cellular communication module is adapted to formulate a cancel message to cancel the previously communicated call forwarding message, the cancel message for transmission to the remote wide area cellular network.

8. The mobile phone device of claim 7, wherein the wide area cellular communications module and the short-range wireless local area network module are computer software modules integrated within a digital processor device.

9. The method of claim 2, wherein the call destined to the mobile phone is communicated between the remote cellular network element and the wireless local area network base station without utilizing a public switched telephone network.

10. The mobile phone of claim 7, further comprising a memory adapted to store the IP address and a local port number that uniquely identify a communication path between the mobile phone and the wireless local area network.

11. The mobile phone of claim 7, further comprising a network messaging module to selectively communicate text messages via one of the wide area cellular communications module and the short-range wireless local area network module.

12. A method of forwarding a call from a mobile communication device, the method comprising:
   receiving an Internet Protocol (IP) address at a wireless communication device from a dynamic host configuration protocol (DHCP) module of a wireless local area network device via a short range wireless network, the wireless communication device including a wide area network communications module to communicate with a wide area wireless network and a local area network communications module to communicate with the wireless local area network device;
   establishing a connection to a Voice over Internet Protocol (VoIP) provider via the wireless local area network using the IP address;
   after the mobile communication device is registered with the VoIP provider, sending a call forwarding message from the mobile communication device to a cellular network element of the wide area wireless network via the wide area network communications module, the call forwarding message including data related to the VoIP provider to forward calls intended for the mobile communications device to the VoIP provider for routing to the mobile communication device via the wireless local area network; and
   determining that the mobile phone has moved out of range of the wireless local area network base station and while the mobile phone is out of range of the wireless local area network base station, sending a message to the cellular network element to cancel call forwarding to the wireless local area network base station.

13. The method of claim 12, further comprising receiving a phone call at the mobile communication device via the local area network communications module, the phone call being forwarded from the wide area wireless network to the VoIP provider and from the VoIP provider to the IP address associated with the wireless local area network.

14. The method of claim 12, wherein the call forwarding message further includes a port number defining a communication path to the mobile communication device via the short range wireless network.

15. The method of claim 12, wherein the short range wireless network comprises an 802.11 protocol network.

16. The method of claim 12, wherein the mobile communication device further includes a memory to store an Internet Protocol (IP) address of the VoIP provider and to store a user identification and password associated with the VoIP provider, wherein communicating with the VoIp provider comprises accessing the IP address of the VoIP provider and sending the user identification and password to the VoIP provider to establish a connection between the mobile communication device and the VoIP provider.

* * * * *